INVENTOR
Charles J. Westin
BY Augustus B Stoughton.
ATTORNEY.

Patented Sept. 29, 1942

2,297,596

UNITED STATES PATENT OFFICE 2,297,596

DIRECT-ACTING OPERATION CHECK

Charles J. Westin, Philadelphia, Pa., assignor to F. J. Stokes Machine Company, Philadelphia, Pa., a corporation of Pennsylvania Application April 19, 1939, Serial No. 268,679

4 Claims. (Cl. 192—125)

Automatic molding machines are used for manufacturing articles from plastic materials and produce a succession of individual, molded articles or a succession of pluralities of individual, molded articles. In case of the failure of the machine to properly eject or discharge therefrom the molded article or articles, damage to the machine is likely to be caused.

It is an object of my invention, therefore, to provide means for quickly and surely stopping the machine immediately upon the failure of the machine to discharge or eject a properly molded article or articles therefrom. These means consist of a delicate or sensitive electric switch arranged so as to be operated by a small amount of pressure and a movement of an exceedingly minute distance in response to one or more articles properly issuing from the machine.

For a further exposition of my invention, reference may be had to the annexed drawings and specification at the end thereof my invention will be specifically pointed out and claimed.

Figure 1:
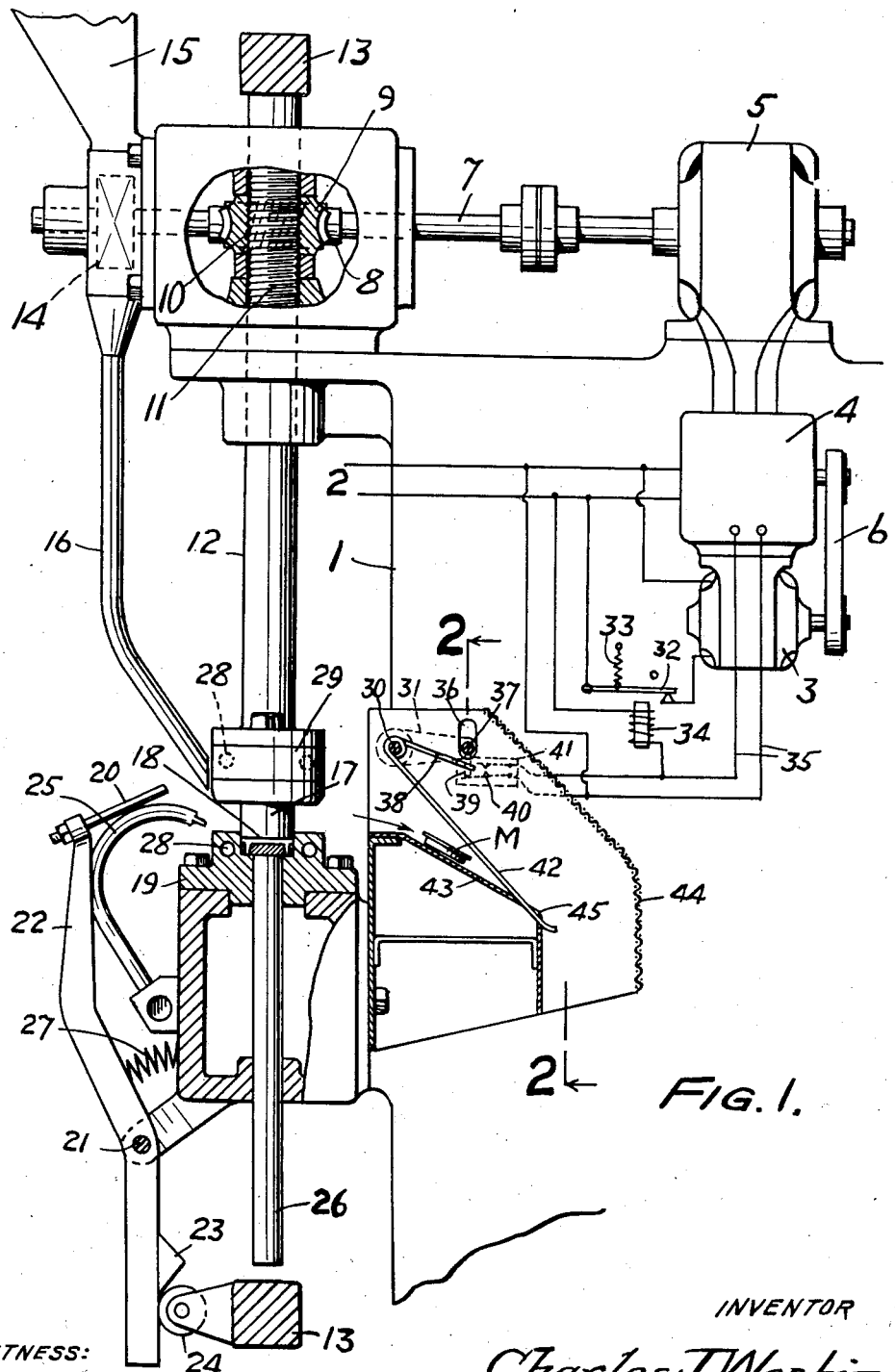
Fig. 1 is a fragmentary diagrammatic view with parts in vertical cross-section and the circuit connections shown in diagram.
Figure 2:
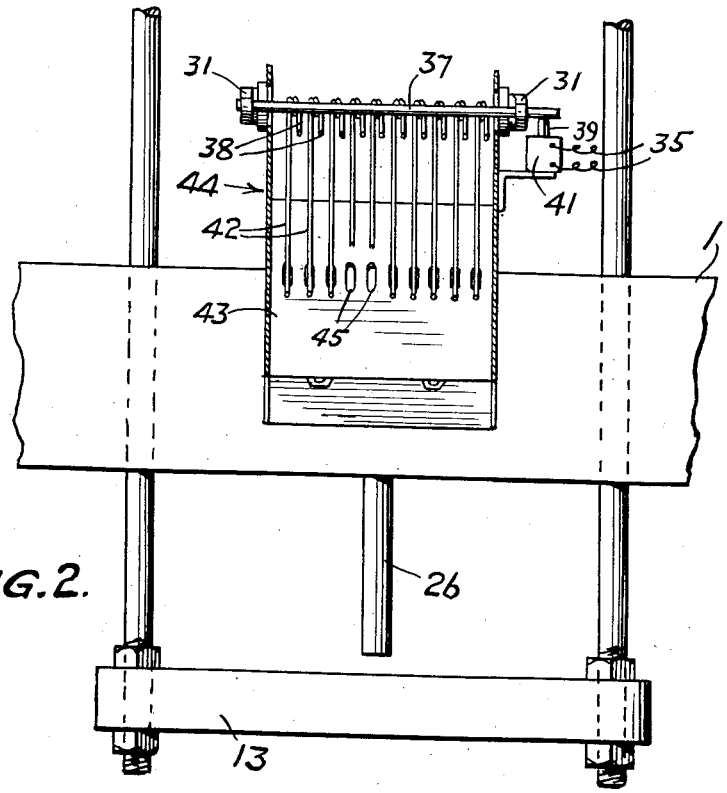
Fig. 2 is a fragmentary elevation at right angles to Fig. 1 with parts shown in vertical cross-section on the line 2—2 of Fig. 1.

From among the numerous embodiments which my invention may take, I have selected one for illustration in Figs. 1 and 2 of the drawings and the following description. As here shown, my device consists of an automatic molding machine, particularly one suitable for use in producing articles from plastic, and particularly from thermo-plastic, materials. This machine has a frame 1 on which the various parts are mounted. There is provided a source of power 2 shown as an electric circuit but any other convenient source of power may be used. Connected across circuit 2 is a controller motor 3 which drives a controller 4 connected to source 2 and to press motor 5 so as to control the cycle of operations by reversing the connections of press motor 5. Controller 4 is driven from controller motor 3 by any convenient means such as belt 6. Press motor 5 drives shaft 7 which carries thereon worm 8 meshing with worm-gear 9, worm-gear 9 having on its inner surface screw-threads 10 meshing with screw-threads 11 on mold ram 12. Shaft 7 also carries a valve 14 controlling the flow of material from hopper 15 through a chute or other feeder 16 to the mold cavity 18 located below mold punch 17.

Machine frame 1 also carries lower mold 19 which forms one part of cavity 18. Also mounted on frame 1 is an ejector 20 mounted on pivot 21 by means of lever 22, which carries on the opposite side of pivot 21 a projection 23 cooperating with a roller 24 on frame 13. Air jets 25 are also provided adjacent mold cavity 18 for ejecting or aiding in ejecting the molded article therefrom. Through lower mold 19 projects ejector rod 26 having its upper end extending into mold cavity 18. Spring 27 causes ejector 20 to be controlled by roller 24 by causing the end of lever 22 to stress against roller 24. Lower mold element 19 and mold rod connection 29 are both provided with means 28 for applying heat to the mold.

For conveying the molded article or articles M away from the machine, there is provided a conveyor or chute having an inclined bottom wall 43, two side walls 44a and 44b and a top or cover 44c which is preferably formed of screen material to facilitate inspection of the elements within the chute and to prevent blowing of the article out of the chute. A number of spaced notches 45 are provided in plate 43 in which rest the ends of a number of feelers or tentacles 42 pivotally supported upon a rod 30 arranged across the chute above the point where the molded article is blown into the chute by the blast from jet 25.

Controller motor 3 is connected to source 2 in series with switch 32 which is biased to open position by a spring 33 and which is attracted by electro-magnet 34 when electro-magnet 34 is energized. Switch 41 is connected in series with electro-magnet 34 and in parallel with a pair of contacts forming a part of controller 4 and connected by means of leads 35. The contacts in controller 4 connected to leads 35 are normally closed for substantially all of the operating cycle of controller 4, but are opened for a short part of the cycle at the instant when an article is discharged from the mold.

Switch 41 may be of the type commonly known as a micro-switch although any similar, simple contact switch might be used. The preferred switch, however, has certain desirable features in that it is exceedingly sensitive, requiring only 12 to 14 ounces of operating pressure with a differential of only 4 ounces. Another important feature is that only a small amount of movement is needed; for example, a movement of .001 of an inch net is usually sufficient to operate the switch and obtain the snap action so desirable in devices of this kind. The switch itself is described in U. S. Patent 1,960,020. Switch 41 has contacts 40 therein and is mounted so that contact button 39 extends up so that rod 37, which extends through notches 36, rests on button 39. Rod 37 extends across the conveyor and is supported by levers 31, one at each side of the conveyor. Levers 31 are mounted on rod 30 which also supports the feelers or tentacles 42, which are provided with an upper arm 38 and which extend by their own weight down into notches 45 in plate 43.

The operation of my device may be summarized as follows. With controller 4 in proper position, a starting switch (not shown) is closed and controller motor 3 begins to operate controller 4 through a cycle to first cause press motor 5 to move mold ram 12 and valve 14 in such a way as to feed and compress a charge of moldable material into the mold cavity 18 and to mold an article of the desired shape therein. Controller 4 then causes press motor 5 to reverse, thus lifting mold ram 12 and the parts carried thereby out of cavity 18. Further movement of mold ram 12 causes frame 13 to contact with ejector rod 26 and lift the molded article out of mold cavity 18, while at the same time a valve (not shown) causes a jet of air to issue from nozzle 25 and, at the same time, roller 24 contacts with projection 23 and moves ejector 20 over against the molded article so as to prevent the molded article from sticking to the mold rod punch 17 or lower mold element 19. The molded article M is thus properly ejected and discharged or ejected from the mold cavity and falls on the plate 43 over which it moves by gravity or by the action of the air jets, thus lifting one or more of the tentacles or feelers 42, thereby lifting rod 37 and allowing contacts 40 of switch 41 to close. Controller 4 has simultaneously caused the contacts of the switch connected in parallel with switch 41 by leads 35 to open so that, when contacts 40 of switch 41 are closed in response to molded article M, relay 34, which is of the time-delay type, remains energized so that switch 32 remains closed and controller motor 3 continues to actuate controller 4 and causes the machine to perform repeated cycles of operation until electro-magnet 34 is de-energized by the failure of switch 41 to close in response to the failure of the machine to properly eject a molded article M which, in turn, operates switch 41 through elements 42, 38, 37 and 39.

Figure 3:
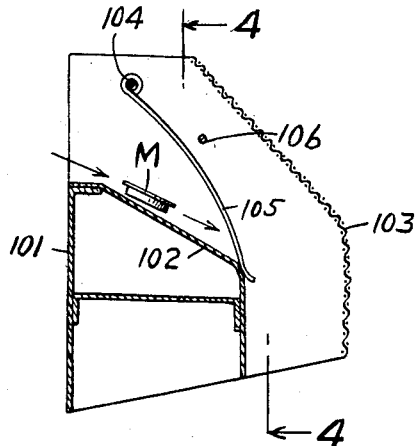
Fig. 3 is a detailed view with parts in transverse cross-section of a modification of the off-take conveyor and switch.
Figure 4:
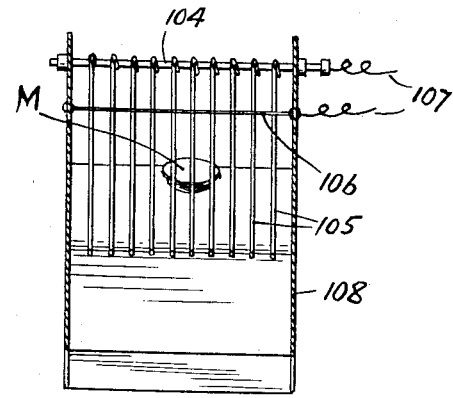
Fig. 4 is a view at right angles to Fig. 3 with parts shown in vertical cross-section on line 4—4 of Fig. 3.

A simplified form of switch is shown in Figs. 3 and 4. In this modification, conveyor or chute 101 has a bottom plate 102 over which the molded articles M slide into contact with one or more of the feelers or tentacles 105 pivotally mounted at 104 and forming part of the circuit. The other side of the circuit is formed by rod 106 extending above the feelers 105 and insulated therefrom. Current of suitable low voltage is led to pivot 104 and tentacles 105 and rod 106 by leads 107. The conveyor is provided with a screen or other perforated cover or guard 103 which shields the charged elements 104—105—106 and which prevents the molded articles M from being thrown out of the chute by the air jets. The modification shown in Figs. 3 and 4 is connected into circuit and operates in the same way as the modification previously described.

In both forms of switch arrangements disclosed herein, the control circuit is closed only momentarily by an article passing through the chute, but due to the fact that relay 34 is of the time-delay type, the circuit to motor 3, completed by the contact 32 of the relay, remains closed for an appreciable time sufficient for the controller 4 to move into position to again close the controller contacts connected across leads 35 and thereby continuing energization of relay 34.

Both switch arrangements involve a plurality of feelers 42 or 105 arranged in spaced relation across the chute through which the article passes, and operation of one or more of the feelers will effect closing of the circuit through the relay 34. This construction results in a switching arrangement which requires very little force for operation of the switch, as compared with an arrangement where a single operating element extends entirely across the chute. Furthermore, by forming the switch-operating elements as a number of feelers spaced apart across the chute has the further advantage that it offers very low resistance to the passage of the air blast from the jet 25, and thereby prevents operation of the switch by the force of the blast.

I do not intend to be limited save as the scope of the prior art and of the attached claims may require.

I claim:

1. An article-operated switch mechanism comprising a chute having an inclined surface for conducting articles along a predetermined path by the action of gravity, a rod extending across said chute above said inclined surface, a plurality of spaced feeler elements pivotally supported upon said rod and having their free ends resting upon said inclined surface and adapted to be engaged and tilted upwardly by articles passing over said inclined surface, and normally open switch means operated to closed position by tilting of any one of said feeler members in response to articles passing through said chute.

2. An article-operated switch mechanism comprising a chute having an inclined surface for conducting articles along a predetermined path by the action of gravity, a rod extending across said chute above said inclined surface, a plurality of spaced feeler elements pivotally supported upon said rod and having their free ends resting upon said inclined surface and adapted to be engaged and tilted upwardly by articles passing over said inclined surface, a single switch mounted adjacent said chute, an operating element for said switch arranged transversely of said chute and adapted to be engaged and operated by the tilting of any one of said feeler elements.

3. An article-operated switch mechanism comprising a chute having an inclined surface for conducting articles along a predetermined path by the action of gravity, a conducting rod extending across said chute above said inclined surface, a plurality of conducting feeler elements pivotally supported upon said rod in spaced relation and having their free ends resting upon said inclined surface and adapted to be engaged and tilted by articles passing over said inclined surface, a second conducting rod supported across said chute above said feeler members and being mounted in insulated relation with respect to said chute, each of said feeler members being adapted to engage said second rod and complete a circuit between said two rods when tilted by an article passing through said chute.

4. An article-operated switch mechanism comprising, in combination, a sloping plate for conducting articles along a predetermined path by the action of gravity, a plurality of feeler elements pivotally mounted in spaced relation above said sloping plate and having their free ends resting upon the upper surface of said plate, said feeler elements being mounted for independent movement and being adapted to be tilted upwardly by articles passing over said plate, switch means, and means for actuating said switch means in response to the upward tilting of any one of said feeler elements.

CHARLES J. WESTIN.